United States Patent
Naji et al.

(10) Patent No.: US 11,679,664 B2
(45) Date of Patent: Jun. 20, 2023

(54) VENTILATION DEVICE OF A MOTOR VEHICLE

(71) Applicant: Valeo Systemes Thermiques, Le Mesnil-Saint-Denis (FR)

(72) Inventors: Said Naji, Le Mesnil Saint Denis (FR); Ralph Stroehla, Bad Rodach (DE); Clemens Wachter, Bad Rodach (DE)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 35 days.

(21) Appl. No.: 17/056,879

(22) PCT Filed: May 17, 2019

(86) PCT No.: PCT/FR2019/051129
§ 371 (c)(1),
(2) Date: Nov. 19, 2020

(87) PCT Pub. No.: WO2019/224460
PCT Pub. Date: Nov. 28, 2019

(65) Prior Publication Data
US 2021/0197659 A1    Jul. 1, 2021

(30) Foreign Application Priority Data
May 22, 2018 (FR) ..................... 1854253

(51) Int. Cl.
*B60K 1/00* (2006.01)
*B60K 11/04* (2006.01)
*B60K 11/08* (2006.01)

(52) U.S. Cl.
CPC .............. *B60K 11/04* (2013.01); *B60K 11/08* (2013.01)

(58) Field of Classification Search
CPC ................................ B60K 11/04; B60K 11/08
USPC ........................................................ 180/68.1
See application file for complete search history.

(56) References Cited

U.S. PATENT DOCUMENTS

| | | | | |
|---|---|---|---|---|
| 4,210,833 A * | 7/1980 | Neveux | ..................... | F01P 5/02 310/58 |
| 5,156,568 A * | 10/1992 | Ricci | ........................ | B60H 1/26 454/900 |
| 5,730,583 A * | 3/1998 | Alizadeh | ............... | F04D 19/002 416/189 |
| 6,024,536 A * | 2/2000 | Tsubakida | ............. | F04D 29/386 416/189 |
| 6,139,265 A * | 10/2000 | Alizadeh | ............... | F04D 29/544 415/208.1 |

(Continued)

FOREIGN PATENT DOCUMENTS

CN    105508015 A    4/2016

OTHER PUBLICATIONS

International Search Report and Written Opinion in corresponding International Application No. PCT/FR2019/051129, dated Jan. 29, 2020 (12 pages).

*Primary Examiner* — Hau V Phan
(74) *Attorney, Agent, or Firm* — Osha Bergman Watanabe & Burton LLP (57) ABSTRACT

The invention relates to a ventilation device (20) of a motor vehicle, this device comprising:
  an air passage (21) for air set in forced movement, in particular by suction,
  at least one anti-turbulence shield (25; 26) arranged to be placed in the air passage at a location chosen so as to prevent turbulence from forming.

11 Claims, 5 Drawing Sheets

(56) References Cited

U.S. PATENT DOCUMENTS

| | | | | |
|---|---|---|---|---|
| 6,142,733 A * | 11/2000 | Alizadeh | ............... | F04D 29/544 |
| | | | | 416/189 |
| 6,206,635 B1 * | 3/2001 | Golm | ................. | F04D 29/544 |
| | | | | 415/209.1 |
| 6,289,982 B1 * | 9/2001 | Naji | ..................... | F28F 3/044 |
| | | | | 165/177 |
| 6,408,940 B1 * | 6/2002 | Naji | ..................... | F28F 9/0214 |
| | | | | 165/906 |
| 6,607,026 B1 * | 8/2003 | Naji | ..................... | F28D 1/0333 |
| | | | | 165/906 |
| 7,374,408 B2 * | 5/2008 | Savage | ................. | F04D 29/083 |
| | | | | 417/423.9 |
| 7,811,055 B2 * | 10/2010 | Stommel | ............... | F04D 29/544 |
| | | | | 415/208.2 |
| 7,998,233 B2 * | 8/2011 | Maeda | ................. | F02M 35/04 |
| | | | | 55/385.3 |
| 8,510,893 B2 * | 8/2013 | Wong | ................. | A46B 15/0087 |
| | | | | 15/167.1 |
| 8,596,596 B2 * | 12/2013 | Naji | ..................... | F04D 29/668 |
| | | | | 248/315 |
| 8,967,983 B2 * | 3/2015 | Kampf | ................. | F04D 29/522 |
| | | | | 417/423.15 |
| 9,702,576 B2 * | 7/2017 | Avedon | ................. | F24F 13/06 |
| 9,822,800 B2 * | 11/2017 | Pegues | ................. | B60K 11/08 |
| 2008/0289796 A1 * | 11/2008 | Sasano | ................. | F02M 35/06 |
| | | | | 165/51 |
| 2010/0275862 A1 * | 11/2010 | Cassell, Jr. | ............ | F02M 35/06 |
| | | | | 123/184.57 |
| 2013/0196588 A1 * | 8/2013 | Liao | ..................... | F24F 7/007 |
| | | | | 454/338 |
| 2015/0176605 A1 | 6/2015 | Pegues et al. | | |
| 2017/0370363 A1 * | 12/2017 | Avedon | ................. | F04D 25/088 |
| 2018/0128286 A1 * | 5/2018 | Schafer | ................. | F04D 29/522 |

\* cited by examiner

VENTILATION DEVICE OF A MOTOR VEHICLE

The present invention relates to the field of motor vehicle engine cooling, and in particular relates to a ventilation device of a motor vehicle.

A motor vehicle is commonly equipped with cooling systems arranged in its engine bay. The heat engine is thus cooled by a supply of outside air. This outside air makes it possible to cool, via heat exchangers, a fluid further circulating in a thermal loop of the vehicle.

These cooling systems, also called "cooling units", most often include at least one outside air inlet port generally arranged on the body of the vehicle, and for example at the front of the vehicle, one or more heat exchangers arranged in the path of the incoming air as well as a motor-fan unit making it possible to force the intake of air, for example when the vehicle is stationary.

The position of each of the components of these cooling units is predetermined and must be respected in order to ensure the proper functioning of these cooling units. For example, the motor-fan unit must be arranged at a distance sufficiently far from the heat exchangers in order to optimize the operation of the latter.

In a known manner, the components of these cooling units are mounted one after the other on structural parts of the engine bay.

Furthermore, the tonal noise or the harmonic noise generated by the forced circulation of air, in particular when the motor-fan unit is activated, is undesirable for the passengers of the motor vehicle. These noises can be heard outside or inside the vehicle.

This noise is due in particular to fan blades stirring air too close to the arms which bear the motor-fan unit.

The applicant has observed that when a blade passes close to the arms, the air flow creates turbulence around the arms. This turbulence is the source of the noise.

The applicant has observed that the noise level depends in particular on the velocity of the air flow and on the distance between the blades and the arms. The frequency of the noise depends in particular on the number of arms.

It would be possible to reduce noise in various ways.

For example, it would be possible to increase the distance between the arms and the blades, but this would increase the size of the device, which is not acceptable for many automobile manufacturers.

It would also be possible to increase the number of blades to distribute the energy per blade, but this would increase the costs and moreover the performance of the air flow can be affected.

Finally, it would be possible to reduce the number of arms or change the shape of the arms, but this could result in inadequate mechanical strength.

The applicant has found that a new approach is possible, which avoids the above drawbacks.

The invention thus relates to a ventilation device of a motor vehicle, this device comprising:
- an air passage for air set in forced movement, in particular by suction,
- at least one anti-turbulence shield arranged to be placed in the air passage at a location chosen so as to prevent turbulence from forming.

The invention makes it possible to reduce noise, in particular tonal noise, without having to change other aspects of the performance of the ventilation device. Since the noise is generated by the turbulence in particular around the arm(s), reducing the turbulence makes it possible to reduce the noise.

There is no need to increase the number of blades or reduce the number of arms.

The number of arms can for example be less than or equal to 6.

According to one of the aspects of the invention, the anti-turbulence shield is placed in the air passage at a location chosen so as to prevent turbulence from forming, this turbulence would then be, if not prevented, among that of greater amplitude in this air passage. These zones also correspond to areas of high air flow speeds.

Advantageously, the shield or shields occupy a total area of less than 20%, or even less than 10%, or even 5%, of the total area of the air passage, so as not to affect the performance of the ventilation device.

According to one of the aspects of the invention, the ventilation device comprising a support for a motor-fan unit, this support comprising at least one arm for mechanically holding the motor, the shield is arranged to prevent turbulence from forming upon contact with this arm.

According to one of the aspects of the invention, the anti-turbulence shield is formed on the support for the motor-fan unit.

According to one of the aspects of the invention, the anti-turbulence shield is attached, then fixed, for example by snap-fitting or force-fitting, on the support for the motor-fan unit. Thus, the anti-turbulence shield is a part separate from the support.

According to one of the aspects of the invention, the anti-turbulence shield is placed upstream of a radiator, which is itself placed upstream of the fan.

According to one of the aspects of the invention, the anti-turbulence shield is placed between a heat exchanger, in particular a radiator, and a fan.

According to one of the aspects of the invention, the anti-turbulence shield is placed downstream of a fan, in particular between the fan and the motor-fan unit support.

According to one of the aspects of the invention, the anti-turbulence shield is placed downstream of the motor-fan unit support.

The invention also relates to a support for a motor-fan unit, in particular for a ventilation device as claimed in one of the preceding claims, comprising an anti-turbulence shield arranged to be placed in the air passage at a location chosen so as to prevent turbulence from forming.

According to one of the aspects of the invention, the support comprises:
- a housing to receive the motor-fan unit,
- a peripheral region,
- at least one arm connecting the housing to the peripheral region, in particular a plurality of arms connecting the housing to the peripheral region.

According to one of the aspects of the invention, these arms are equi-angularly distributed. As a variant, the arms are spaced at varying angular intervals.

According to one of the aspects of the invention, the support is made in one piece, in particular by molding.

According to one of the aspects of the invention, the housing comprises a ring for receiving the motor-fan unit.

According to one of the aspects of the invention, the arms are connected to the ring.

According to one of the aspects of the invention, the arms are substantially straight or curved.

According to one of the aspects of the invention, only certain arms are provided with a shield, the others being without. These are for example of substantially constant width throughout. These arms are conventional arms.

According to one of the aspects of the invention, the peripheral region defines an opening of substantially circular shape and the housing for the motor-fan unit is arranged substantially in the center of this opening.

According to one of the aspects of the invention, the anti-turbulence shield is at partially arranged in this opening.

According to one of the aspects of the invention, this opening has a border, which is in particular circular, and the shield is adjacent to this border.

As a variant, the shield is distant from this border.

According to one of the aspects of the invention, the shield is arranged between two consecutive arms.

According to one of the aspects of the invention, the shield is adjacent to one of the arms, and also adjacent to the border.

According to one of the aspects of the invention, the shield extends radially in the opening over a distance of at most half the length of the arm, in particular at most ¼, or even ⅕ or ⅛ of the length of the arm.

According to one of the aspects of the invention, the shield comprises a face opposing the circulation of the air flow.

According to one of the aspects of the invention, this face extends substantially in a plane parallel to the plane of the opening.

According to one of the aspects of the invention, this face could optionally have a shape at least locally curved with respect to the plane of the opening.

According to one of the aspects of the invention, the shield has the shape of a tongue.

According to one of the aspects of the invention, the arm comprises a side provided with reinforcing ribs and the shield, which has the shape of a tongue, is connected to this side of the arm which is provided with reinforcing ribs.

According to one of the aspects of the invention, the tongue of the shield extends substantially along the border of the opening.

According to one of the aspects of the invention, the shield has a setback which connects to one side of the arm.

According to one of the aspects of the invention, the shield has a shape substantially chosen from: circular, polygonal, rectangular, square or any other shape.

According to one of the aspects of the invention, the shield is adjacent to an annular rib, which is in particular parallel to the transverse axis of the opening, along the border of this opening.

According to one of the aspects of the invention, an annular rib is provided, which is in particular parallel to the transverse axis of the opening and extends along the border of this opening, this rib having a height, which may be raised or not, to have a good compromise between acoustic performance and aeraulic performance.

According to one of the aspects of the invention, the width of the shield is in particular at least equal to the dimension of the larger arm.

According to one of the aspects of the invention, the shield is at a distance at least equal to the distance between the arm and the blades of the fan.

According to one of the aspects of the invention, this raised rib is in particular higher in height than a neighboring concentric rib of greater radius.

According to one of the aspects of the invention, the shield is formed integrally with the transverse region and/or one of the arms.

According to one of the aspects of the invention, the shield can have any shape.

Its width is in particular at least equal to the width of the arm plus at least 5%.

Its length can be between 5% and 100% of the length of the arm.

Its thickness is a relatively less important characteristic.

A further subject of the invention is a method for preventing turbulence from forming, this method comprising the following step:
providing an anti-turbulence shield so as to prevent turbulence from forming in an air passage of a ventilation device of a motor vehicle.

According to one of the aspects of the invention, the method comprises the following step:
identifying one or more areas of strong turbulence and high air velocities in the forced air passage, for example by numerical simulation or by real-life testing,
placing in this or these zones at least one anti-turbulence shield so as to prevent turbulence from forming or to limit this turbulence in this zone or these zones, so as to reduce the noise generated by the circulation of air.

According to one of the aspects of the invention, the ventilation device comprising a housing, configured to be traversed by an air flow entering the vehicle, and at least one heat exchanger housed in the housing. This housing comprises a plurality of peripheral walls and at least one closing wall arranged for example perpendicular to a vertical end edge of these peripheral walls to form a housing for encapsulating the at least one heat exchanger. The closing wall and one of the peripheral walls form a unitary piece.

"Unitary" is understood to mean that these two walls form a single assembly that cannot be separated without causing damage to at least one of the two walls. In other words, these two walls provide continuity of material. Thus, any leaks which could be linked to poor connection between the peripheral wall of the housing and its closing wall are reduced, making it possible to obtain a better efficiency of these cooling units and consequently making it possible to reduce the size of the heat exchangers encapsulated in the housings of these cooling units.

Further features, details and advantages of the present invention will become more clearly apparent from reading the detailed description given below by way of indication and with reference to the various illustrative embodiments of the invention depicted in the following figures.

Figure 1:
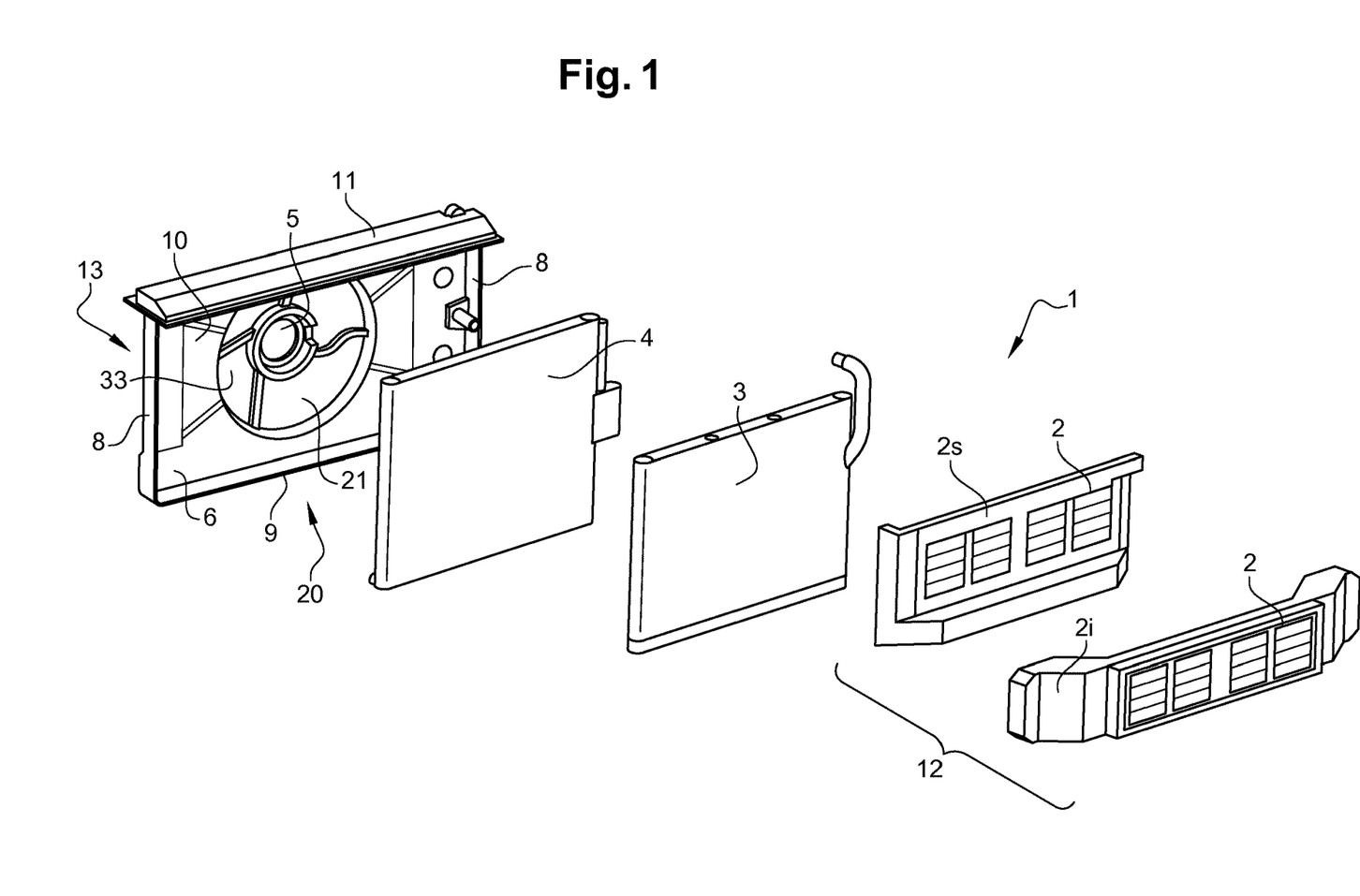
FIG. 1 is an exploded view of a cooling unit of an engine bay, with a ventilation device, in which unit a device for regulating the intake of outside air into this cooling unit has been made visible, a condenser, a radiator and a fairing configured to carry a motor-fan unit.

FIG. 1 shows various elements which can be included in a cooling unit 1 intended to be integrated into an engine bay of a vehicle according to the present invention. Such a cooling unit 1 can in particular comprise at least one device 2 for regulating the intake of air into the cooling unit 1, one or more stacked heat exchangers including, by way of nonlimiting example, a condenser 3 and a radiator 4, and at least one motor-fan unit 5.

The device 2 for regulating the intake of air can for example consist of a grille 2s, 2i with adjustable flaps, as illustrated in FIG. 1. This grille 2s, 2i comprises an upper part 2s and a lower part 2i fixed one on the other and offset with respect to each other. This offset may in particular make it possible to arrange an additional heat exchanger.

According to one embodiment of the present invention, the cooling unit 1 may comprise a first heat exchanger consisting of a condenser 3 and a second heat exchanger consisting of a radiator 4. The radiator 4 allows the cooling of the heat engine via an exchange between the outside air and a cooling liquid circulating in this radiator 4 while the condenser 3 is an element of an air conditioning circuit with a network of exchange between the incoming fresh air and a refrigerant.

The motor-fan unit 5 can for its part be integrated into a fairing 6 and makes it possible to force the intake of air into the cooling unit 1 when this intake of air is no longer sufficient, for example in situations in which the vehicle is stationary or at least slowed down, then disrupting this intake of air.

This fairing 6 may have two lateral returns 8, a lower edge 9 and a bottom wall 10 in which the motor-fan unit 5 is integrated.

According to the present invention, the heat exchangers 3, 4 can be encapsulated in a housing of the cooling unit that participates in forming, on one hand, the grille 2s, 2i carrying the device 2 for regulating the intake of air and, on the other hand, the fairing 6 integrating the motor-fan unit 5.

More particularly, this housing has at least one closing wall 11 which covers or closes a volume in which the heat exchangers are housed and which is defined by the arrangement of four peripheral walls, namely: a front transverse wall 12, a rear transverse wall 13, these front and rear transverse walls 12, 13 being arranged across an air flow entering the vehicle, and two left and right longitudinal walls, which are not shown here.

Thus, the air flow entering the vehicle passes successively through the front transverse wall 12 of the housing, one or more stacked heat exchangers 3, 4 and finally the rear transverse wall 13 of the housing.

The front transverse wall 12 of the housing corresponds to the grille 2s, 2i in which the device 2 for regulating the intake of air can be integrated, and the rear transverse wall 13 of the housing bears the motor-fan unit 5.

The rear transverse wall 13 of the housing can in particular consist of the bottom wall 10 of the fairing 6, so that, in accordance with the above, the rear transverse wall can be extended perpendicularly to its edges by two lateral returns 8 and a lower edge 9.

A ventilation device 20 comprises the rear transverse wall 13 and the motor-fan unit 5.

Figure 2:
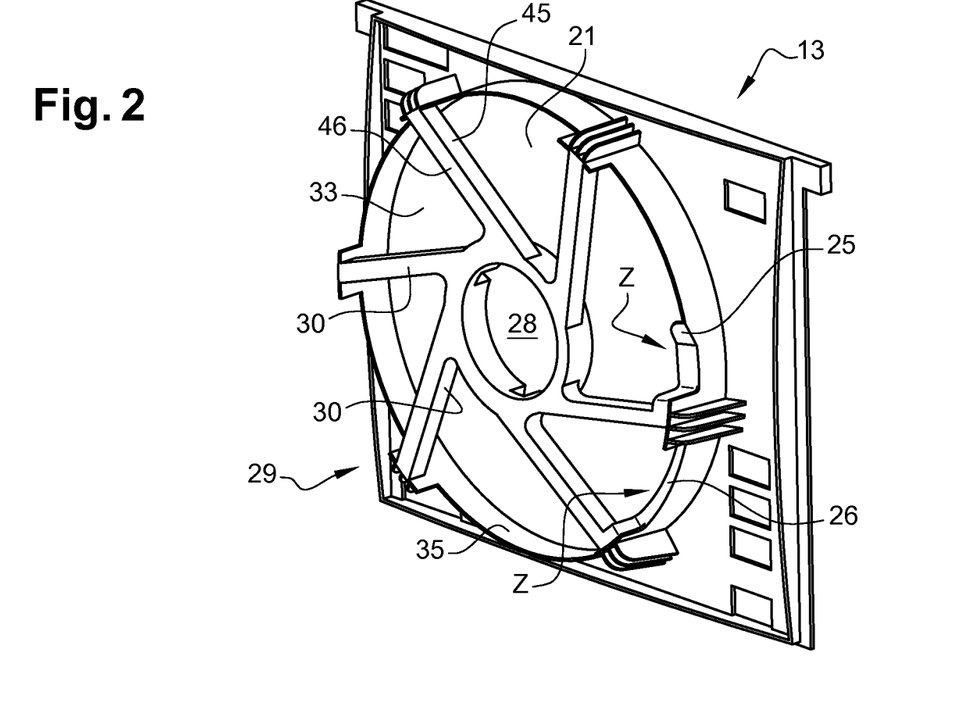
FIGS. 2 to 6 represent different views of the motor-fan unit support.
Figure 3:
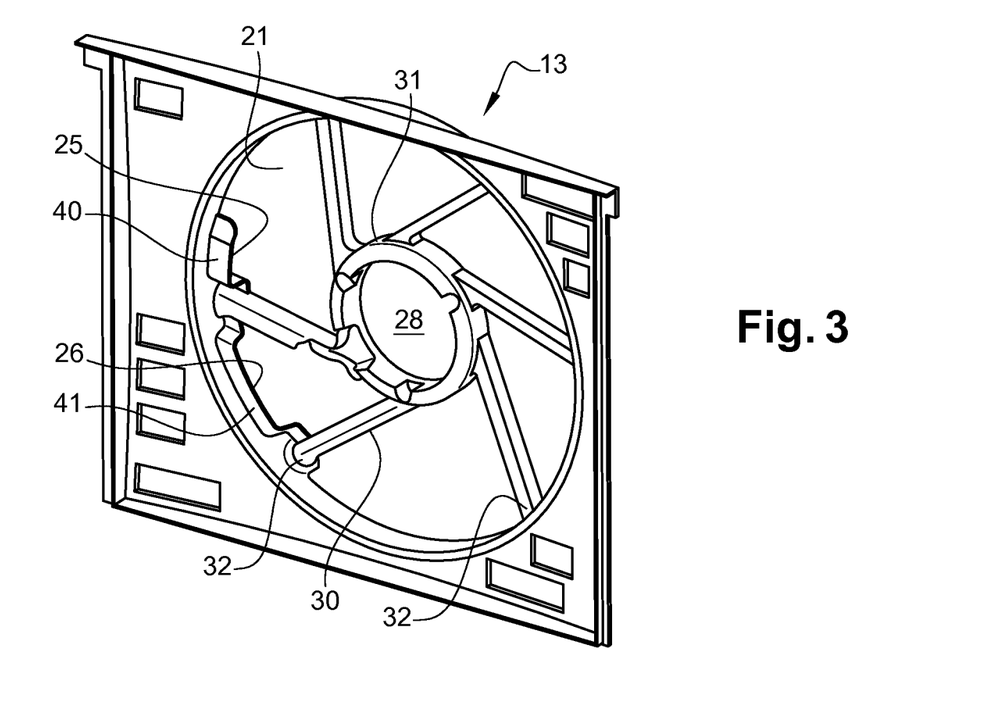

As illustrated in FIGS. 2 and 3 in particular, this device 20 comprises:
- an air passage 21 for air set in forced movement, by suction by blades (not shown) of the motor-fan unit 5,
- anti-turbulence shields 25 and 26 arranged so as to be placed in the air passage 21 in places, or zones, Z chosen so as to prevent turbulence from forming.

These zones Z are chosen so as to prevent turbulence from forming, this turbulence would then be, if not prevented, among that of greater amplitude in this air passage. These zones also correspond to zones of high air flow speeds.

The shields 25 and 26 occupy a total area of less than 5% of the total area of the air passage, so as not to affect the performance of the ventilation device.

The rear transverse wall 13 forms a support 13 for the motor-fan unit. This support 13, or wall 13, comprises at least one arm for mechanically holding the engine, the shield is arranged to prevent turbulence from forming in contact with this arm.

The anti-turbulence shields 25 and 26 are formed on the support 13 for the motor-fan unit.

The support 13 further comprises:
- a housing 28 to receive the motor-fan unit,
- a peripheral region 29,
- six arms 30 connecting the housing 28 to the peripheral region 29.

These arms 30 are distributed around the housing 28 at equi-angular or non-equi-angular intervals.

The support 13 is made in one piece, in particular by molding a plastic material. As a variant, the support 13 can be an attached part.

The housing 28 comprises a ring 31 to receive the motor-fan unit 5 and the arms 30 are connected to the ring 31.

The arms 30 are substantially straight and include a flare 32 at the junction base between each arm and the peripheral region 29.

The peripheral region 29 defines a substantially circular opening 33 for the air passage 21 and the housing for the motor-fan unit is arranged substantially in the center of this opening.

The anti-turbulence shields 25 and 26 are at partially arranged in this opening 33 and therefore in the air passage 21.

This opening 33 has a circular border 35, and the shields 25 and 26 are adjacent to this border 35.

The shields 25 and 26 are arranged between two consecutive arms 30 and are adjacent to one of the arms 30, and also adjacent to the border 35.

The shields 25 and 26 extend radially in the opening over a distance of at most half the length of the arm, in particular at most $\frac{1}{5}$ or $\frac{1}{8}$ of the length of the arm 30, this length being measured from the ring 31 to the border 35.

As illustrated in FIG. 3, the shields 25 and 25 each have a face 40 and 41 respectively opposing the circulation of the air flow.

Figure 4:
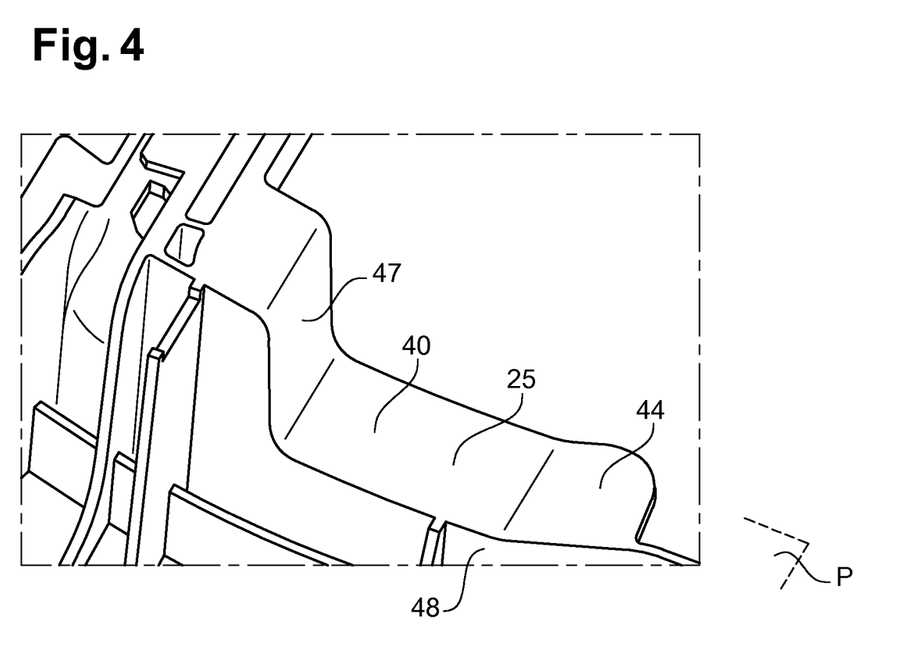

The face 40 of the shield 40 extends substantially in a plane P parallel to the plane of the opening 33, as illustrated in FIG. 4.

Figure 5:
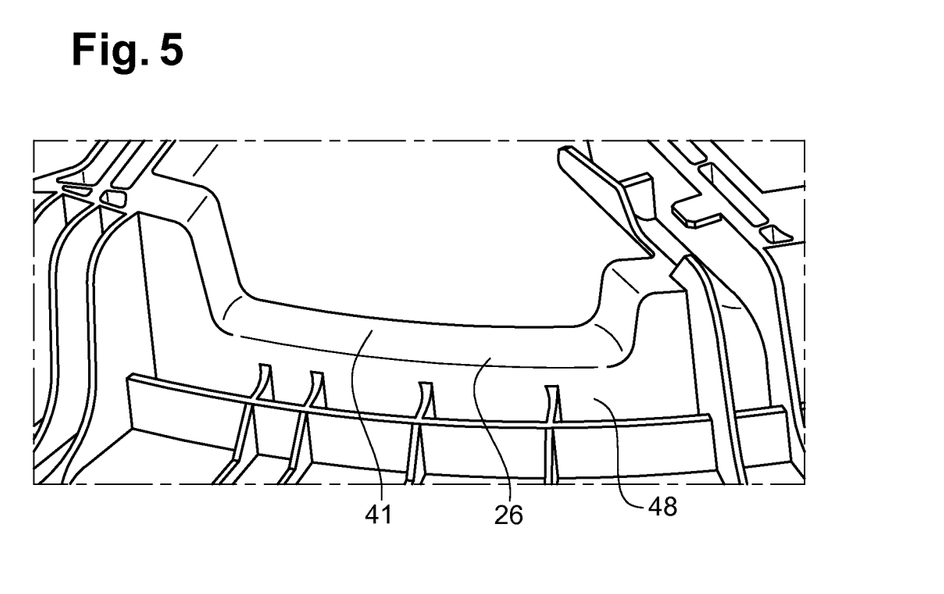

The other face 41 of the shield 26 has a shape that is domed with respect to the plane P of the opening 33, as visible in FIG. 5. This domed shape has a concavity oriented parallel to the air flow.

This face 41 could be planar and not domed.

The shield 25 has the shape of a tongue, as shown in FIG. 4, with a raised end 44.

Each arm 30 comprises a side 45 provided with reinforcing ribs 46, as shown in FIG. 2, and the shield 26, which has the shape of a tongue, is connected to this side 45 of the arm which is provided with reinforcing ribs 46.

This tongue of the shield 25 extends substantially along the border 35 of the opening 33. The shield 25 has a setback 47 which connects to one side 45 of the arm 30.

The shield 25 may, as required, have a shape substantially chosen from: circular, polygonal, rectangular, square or any other shape.

The shields 25 and 26 are adjacent to an annular rib 48, which is in particular parallel to the transverse axis of the opening, along the border of this opening 33.

Figure 6:
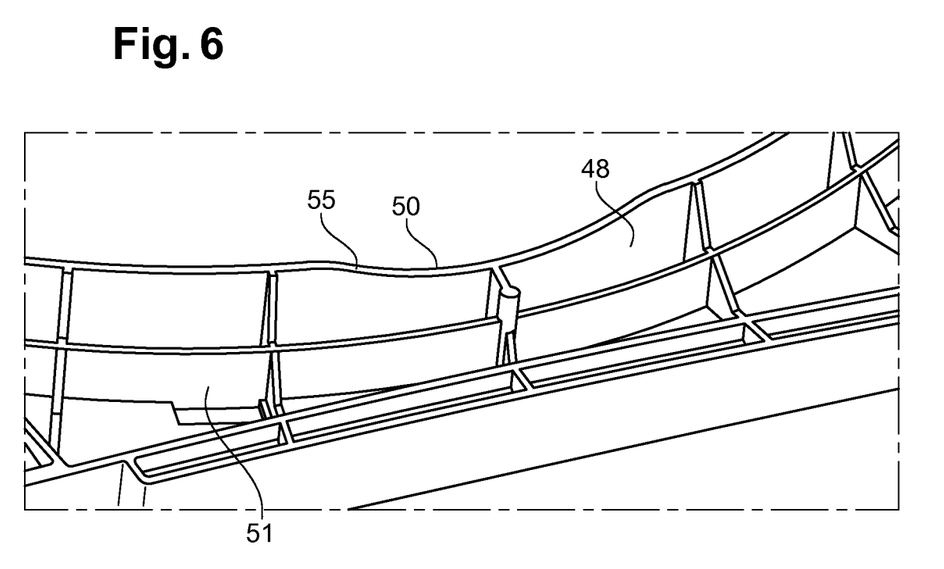

As shown in FIG. 6, an additional element 50 is formed on the annular rib 48, which is parallel to the transverse axis of the opening and extends along the border 35 of this opening, this rib 48 having a height, which may be raised or not, to have a good compromise between acoustic performance and aeraulic performance.

This raised rib 48 is higher in height than a neighboring concentric rib 51 of greater radius. This rib 48 has notches 55.

The ribs 48 and 51 can alternatively have the same height.

Figure 7:
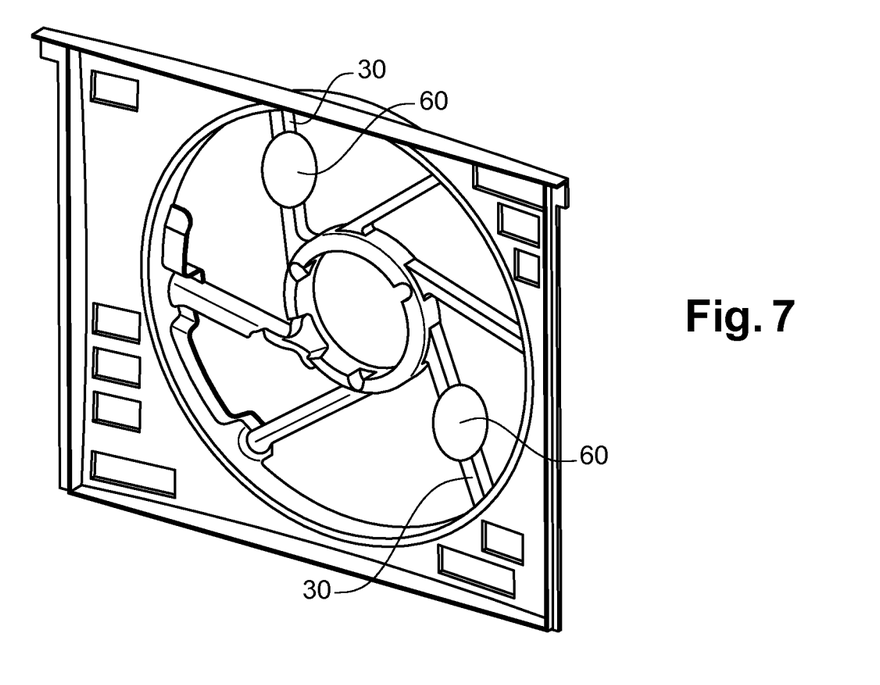
FIG. 7 is a view of a variant of the invention.

In the example illustrated in FIG. 7, the shield or shields 60 are formed on arms 30, here on two of the 6 arms of the support. These shields 60 are spaced apart from the housing 28 and from the border 35.

Figure 8:
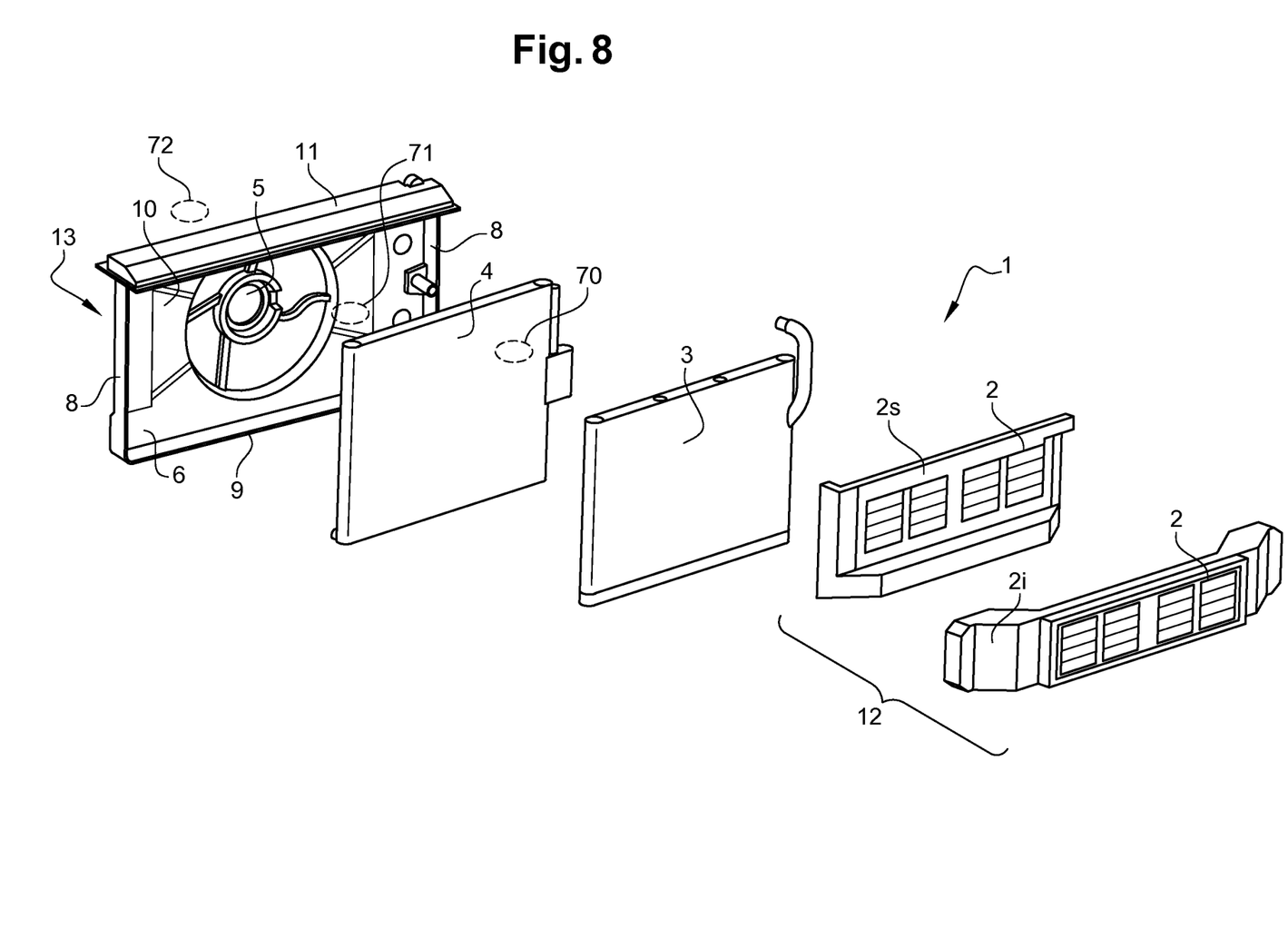
FIG. 8 is a view of another variant.

As can be seen in FIG. 8, according to another aspect of the invention, the anti-turbulence shield 70 is placed upstream of the radiator 4, which is itself placed upstream of the fan.

As a variant, the anti-turbulence shield 71 is placed between a heat exchanger, in particular a radiator 4, and the motor-fan unit, without being formed directly on the component 13.

As a further variant, the anti-turbulence shield 72 is placed downstream of a fan, in particular between the fan and the motor-fan unit support.

In these cases, the shield may be an attached part, mounted for example by snap-fitting or another method, and arranged in these various locations.

The invention claimed is:

1. A ventilation device of a motor vehicle, the device comprising:
   an air passage for air set in forced movement by suction;
   at least one anti-turbulence shield arranged to be placed in the air passage at a location chosen so as to prevent turbulence from forming; and
   a support for a motor-fan unit;
   the support including a housing which receives the motor-fan unit and a peripheral region defining an opening, the housing being arranged substantially in the center of the opening;
   the opening defining a border, wherein the at least one anti-turbulence shield is disposed at the border;
   the support including a plurality of arms for mechanically holding a motor, wherein the arms connect the housing to the peripheral region;
   wherein the at least one anti-turbulence shield extends along the border between two consecutive arms.

2. The device as claimed in claim 1, wherein the at least one anti-turbulence shield is arranged to prevent turbulence from forming upon contact with the at least one arm.

3. The device as claimed in claim 2, wherein:
   the at least one turbulence shield is disposed adjacent to one or more of the arms and not adjacent to one or more of the arms.

4. The device as claimed in claim 2, wherein the opening is of substantially circular shape, and the border is circular.

5. The device as claimed in claim 4, wherein the at least one anti-turbulence shield comprises a face which opposes a circulation of air flow and has the shape of a tongue.

6. The device as claimed in claim 1, wherein the at least one anti-turbulence shield is disposed at a distance from blades of the fan at least equal to a distance between the at least one arm and the blades of the fan.

7. The ventilation device according to claim 1, wherein the at least one anti-turbulence shield does not connect the housing to the peripheral region.

8. The ventilation device according to claim 7, wherein:
   the arms define a radial length extending between the housing and the peripheral region;
   the border is circular; and
   the at least one anti-turbulence shield extends radially in the opening over a distance of at most half the radial length of the arms.

9. A support for a motor-fan unit, for a ventilation device which includes an air passage for air set in forced movement by suction, the support comprising:
   an anti-turbulence shield arranged to be placed in the air passage at a location chosen so as to prevent turbulence from forming;
   a housing which receives the motor-fan unit and a peripheral region defining an opening, the housing being arranged substantially in the center of the opening, the opening defining a border, wherein the at least one anti-turbulence shield is disposed at the border; and
   a plurality of arms for mechanically holding a motor, wherein the arms connect the housing to the peripheral region;
   wherein the anti-turbulence shield extends along the border between two consecutive arms.

10. A method for preventing turbulence from forming, the method comprising:
    providing an anti-turbulence shield so as to prevent turbulence from forming in an air passage of a ventilation device of a motor vehicle; and
    providing a support comprising a housing which receives a motor-fan unit, and a peripheral region defining an opening, wherein the housing is arranged substantially in the center of the opening,
    the support further including a plurality of arms for mechanically holding a motor, wherein the arms connect the housing to the peripheral region, and
    the opening defining a border, wherein the anti-turbulence shield is disposed at the border and extends along the border between two consecutive arms.

11. The method according to claim 10, further comprising:
    identifying one or more areas of strong turbulence and high air velocities in the forced air passage, by numerical simulation or by real-life testing; and
    placing in the one or more areas the at least one anti-turbulence shield, so as to prevent turbulence from forming or to limit in the one or more areas, so as to reduce noise generated by circulation of air.

* * * * *